Dec. 6, 1966 R. K. MacGILLIVRAY 3,289,833
ROTARY MATERIAL SEPARATOR HAVING ADJUSTABLE BAFFLE MEANS
Filed May 21, 1964 4 Sheets-Sheet 3

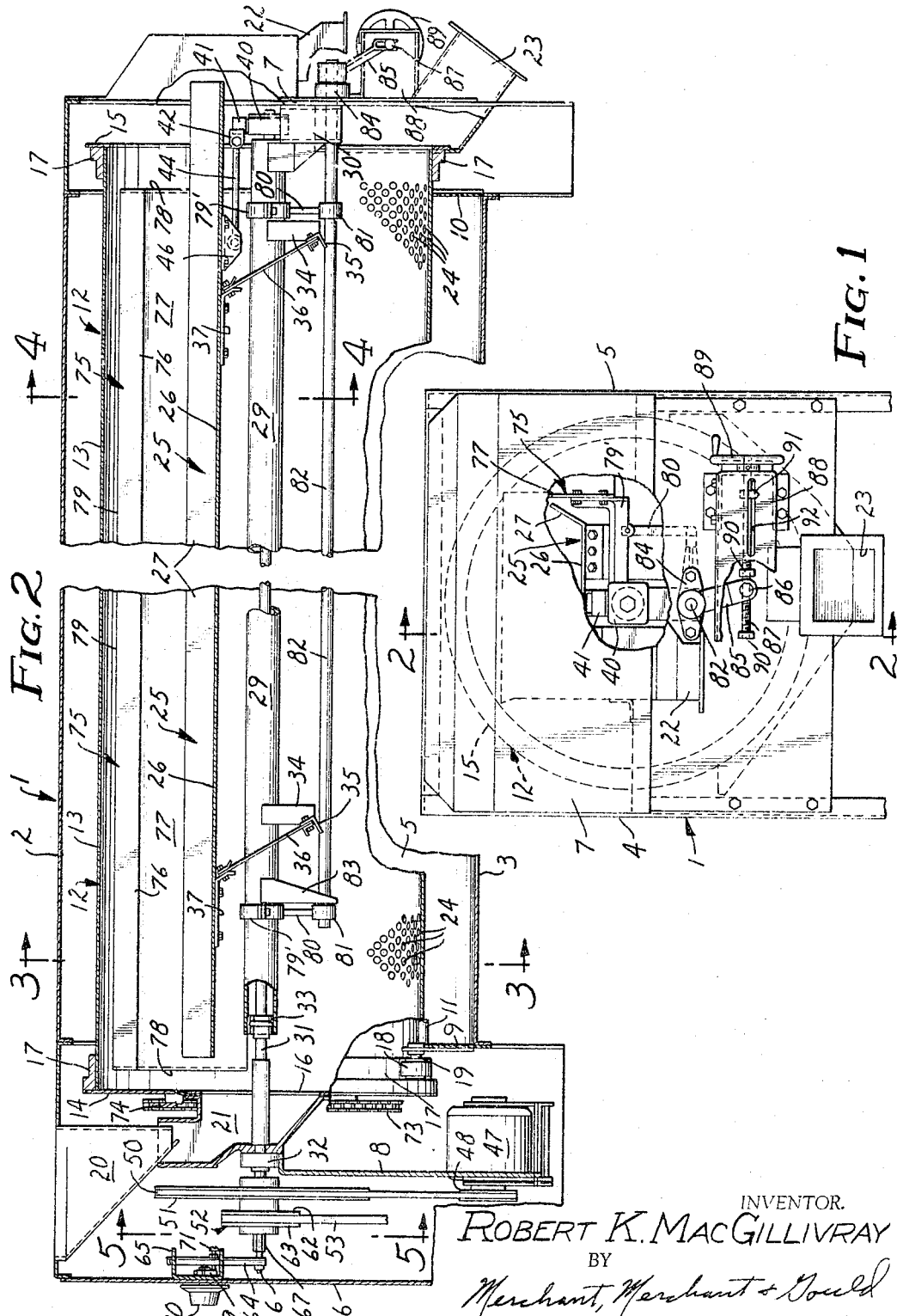

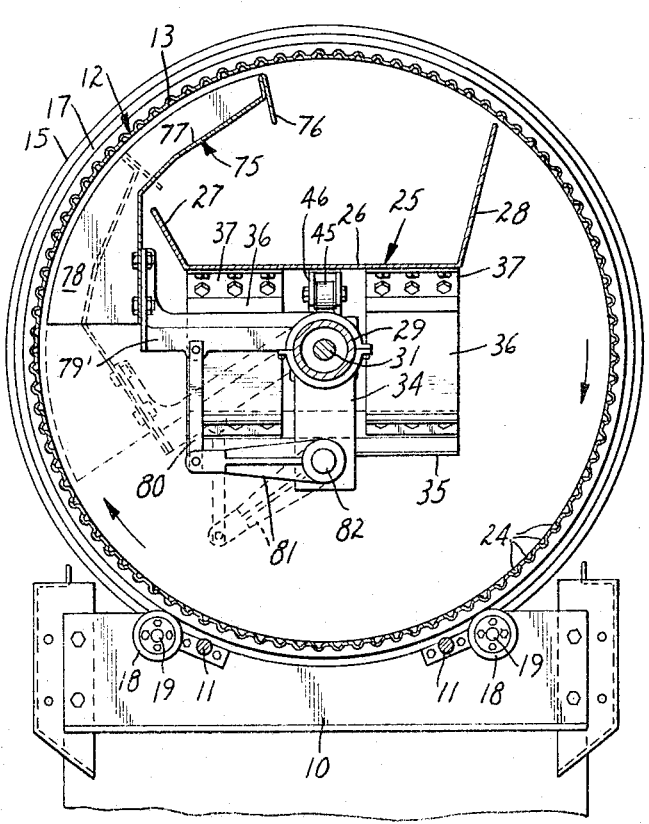
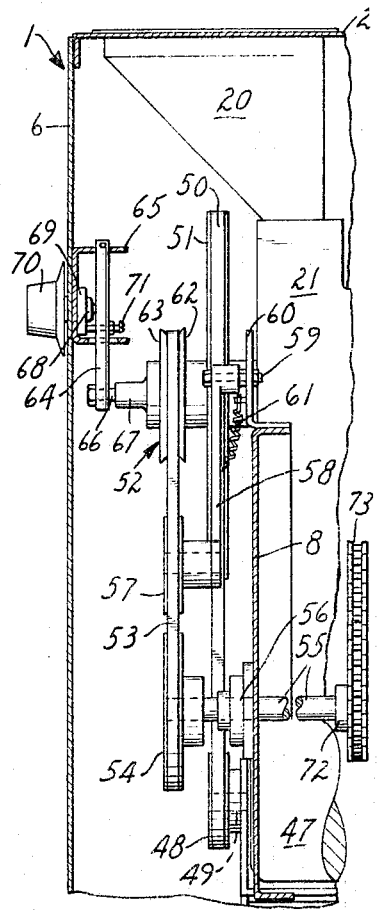
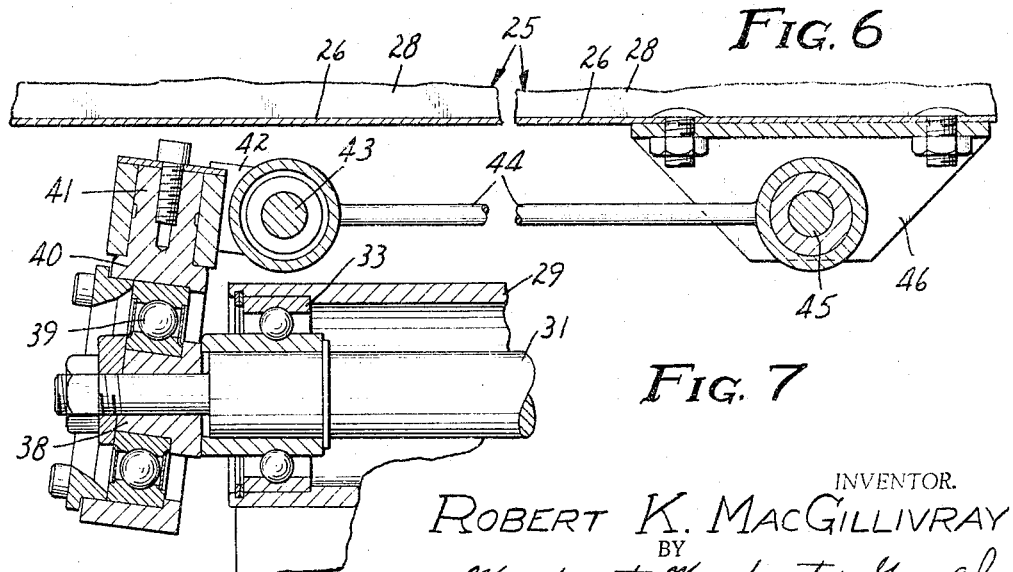

INVENTOR.
ROBERT K. MacGILLIVRAY
BY
Merchant, Merchant & Gould
ATTORNEYS

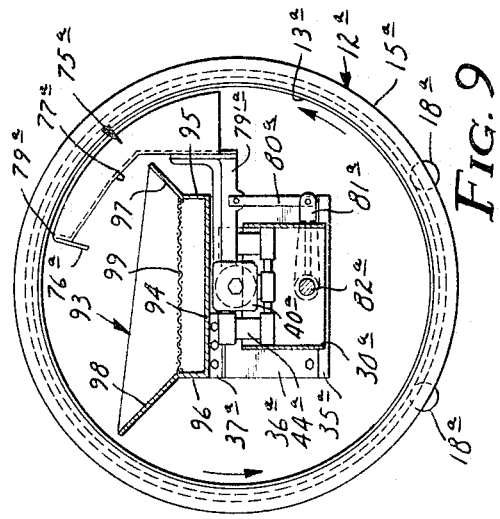

United States Patent Office 3,289,833
Patented Dec. 6, 1966

3,289,833
ROTARY MATERIAL SEPARATOR HAVING
ADJUSTABLE BAFFLE MEANS
Robert K. MacGillivray, Hopkins, Minn., assignor to
Daffin Corporation, Hopkins, Minn., a corporation of
Delaware
Filed May 21, 1964, Ser. No. 369,157
10 Claims. (Cl. 209—75)

This invention relates generally to product or material size grading apparatus, and more particularly to improvements in such apparatus such as grain separators and the like involving rotary cylinders having generally radially inwardly opening pockets of predetermined size for separating by length, width or thickness, and elevating separated out granular material and delivering the same to a discharge conveyor.

Heretofore, cylindrical material size graders have utilized material receiving troughs within the cylinders, and rotary augers in the troughs for discharge of separated out material. When size grading relatively fragile material such as grain and the like, a discharge conveyor of the auger-type is likely to injure some of the granules, particularly if a close clearance is maintained between the auger and its cooperating trough. Should the clearance be sufficiently great to prevent injury to the granules, it is often difficult to remove all of the material from the auger trough, unless special mounting means therefor are provided permitting the trough to be inverted for dumping of the residual granules therefrom. Such arrangements are known, these having the disadvantage of dumping separated or graded material back into the material in the cylinder from whence the dumped material must again be separated. Further, after dumping of the material, it has been difficult to return the auger trough to its precise original position in the absence of somewhat costly trough position indicating means.

An important object of this invention is the provision of a material size grader which is gentle in its treatment of the material handled thereby.

Another important object of this invention is the provision of a material size grader which is self-cleaning.

To the above ends, I provide a generally horizontally disposed cylinder mounted for rotation on its generally horizontal axis and adapted to receive material at one end, elevate a portion of said material by its rotary movement and discharge a portion of said material from its other end; and a generally horizontally disposed vibratory conveyor tray extending substantially the length of the cylinder and mounted therein for vibratory movements in directions to urge the material, deposited thereon from the internally opening pockets in the cylinder, toward the discharge end of the cylinder.

Another object of this invention is the provision of a novel divider element for directing some of the material elevated by rotary movement of the cylinder into the conveyor tray and other of said material away from the tray, and of means mounting the divider element for movements in opposite directions circumferentially of the cylinder, whereby a longitudinally extending dividing edge defined by the divider element is maintained in a predetermined radially inwardly spaced relationship to the inner surface of the cylinder in all positions of circumferential movement of the divider element.

Another object of this invention is the provision of means for conveniently controlling the speed of rotation of the cylinder independently of the speed of vibratory movement of the conveyor tray.

Another object of this invention is the provision of a material size grader as set forth, which is relatively simple and inexpensive to produce, which is highly efficient in operation, and which is rugged in construction and durable in use.

The above, and still further highly important objects and advantages of this invention will become apparent from the following detailed specification, appended claims and attached drawings.

Referring to the drawings, which illustrate the invention, and in which like reference characters indicate like parts throughout the several views:

FIG. 1 is a view in end elevation of a commercial embodiment of the invention, some parts being broken away;

FIG. 2 is a longitudinal section taken substantially on the line 2—2 of FIG. 1, some parts being broken away;

FIG. 3 is an enlarged transverse section taken substantially on the line 3—3 of FIG. 2;

FIG. 6 is an enlarged fragmentary section taken substantially on the line 6—6 of FIG. 5;

FIG. 7 is an enlarged fragmentary section taken substantially on the line 7—7 of FIG. 4;

FIG. 8 is a fragmentary view corresponding to a portion of FIG. 2 but showing a modified form of a conveyor tray of this invention;

FIG. 9 is a view partly in end elevation and partly in section, taken substantially on the line 9—9 of FIG. 8;

FIG. 10 is a view corresponding to FIG. 8 but showing another modified form; and FIG. 11 is a view partly in end elevation and partly in section, taken substantially on the line 11—11 of FIG. 10.

Figure 4:
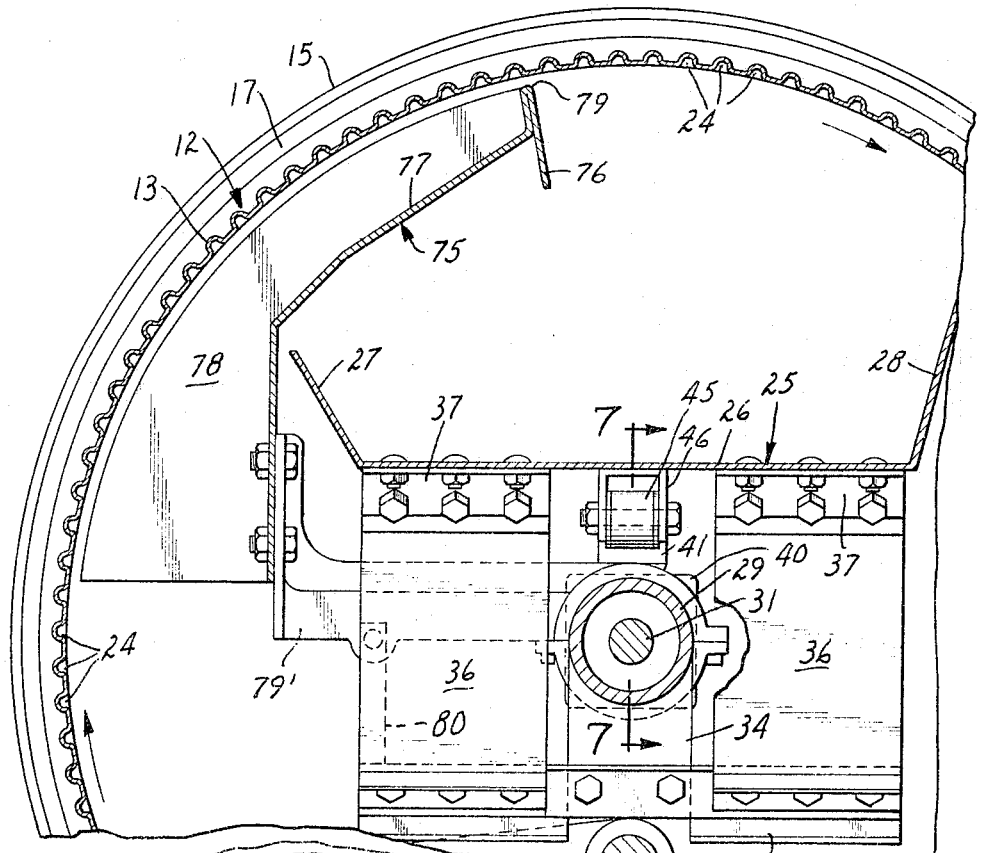
FIG. 4 is a still further enlarged fragmentary transverse section taken substantially on the line 4—4 of FIG. 2.

In the embodiment of the invention illustrated in FIGS. 1–7, a horizontally elongated frame structure or housing 1 is shown as comprising top and bottom walls 2 and 3 respectively, side walls 4 and 5, opposite end walls 6 and 7, a transverse partition 8 and cross members 9 and 10. Preferably, the cross members 9 and 10 are connected by a pair of laterally spaced longitudinally extending rails 11 suitably anchored at their opposite ends to the cross members 9 and 10.

Figure 5:
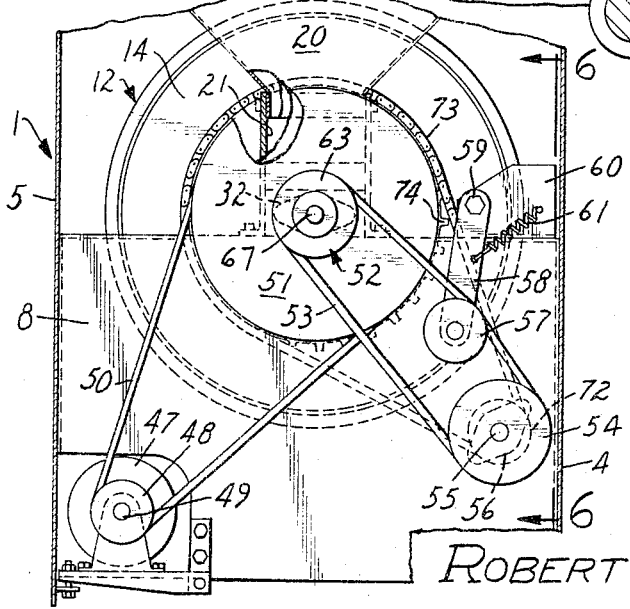
FIG. 5 is a fragmentary view in end elevation as seen from the line 5—5 of FIG. 2, some parts being broken away and some parts being shown in section.

Extending longitudinally within the frame structure or housing 1, between the partition 8 and end wall 7, is an elongated axially generally horizontal drum or cylinder 12 having a cylindrical wall 13, an inlet end wall 14 at one end and an annular ring 15 at its opposite or discharge end. The inlet end wall 14 is formed to provide an axial inlet opening 16 for reception of granular material, such as grain, not shown, to be graded or separated by the apparatus. Adjacent its opposite ends, the cylinder 12 is provided with a pair of annular races 17 which rest upon supporting rollers 18 that are journalled on stub shafts 19 rigidly mounted on respective ones of the cross members 9 and 10. As shown in FIGS. 2, 5 and 6, a pair of inlet chutes 20 and 21 are provided to direct material to the inlet opening 16 of the cylinder 12; and it will be seen, with reference to FIGS. 1 and 2, that a pair of discharge chutes 22 and 23 extend longitudinally outwardly and downwardly with respect to the end wall 7 of the housing 1, the discharge chute 23 being adapted to receive material discharge from the discharge end of the cylinder 12.

As shown in FIGS. 2-4, the entire inner surface of the cylindrical wall 13 of the cylinder 12, between the races 17, is formed to provide a plurality of radially inwardly opening pockets 24 of predetermined width or diameter and depth. The pockets 24 are adapted to receive granules, such as grain of a predetermined size or smaller, when the same is delivered to the interior of the cylinder 12 through the receiving chutes 20 and 21 and the inlet opening 16. The granules that are fully received in the pockets 24 are elevated by rotary movement of the cylinder 12 while the larger grains or granules, while partially elevated by said rotary movement, slide downwardly toward the bottom portion of the cylinder 12 under action of gravity. Preferably, the cylinder 12 is rotated at a speed which will cause the smaller grains or granules to be retained in the pockets 24 until they reach the top portion of the cylinder 12, from whence the granules fall by gravity to conveyor means in the nature of an elongated vibratory tray 25. The conveyor tray 25 extends longitudinally within the cylinder 12 from the inlet end portion thereof and beyond the discharge end of the cylinder 12, terminating within the discharge chute 22, see FIG. 2. As shown, the tray 25 is disposed above the axis of the cylinder 12 and comprises a generally horizontally disposed flat imperforate bottom wall 26 and laterally spaced generally upwardly projecting side walls 27 and 28. Means for supporting the conveyor tray 25 comprises an elongated tubular support member 29 that is coaxial with the cylinder 12 and which is rigidly supported at one end by a bracket 30 that is suitably connected to the end wall 7 of the housing 1. The tubular support member 29 is supported at its other end, adjacent the inlet end of the cylinder 12 by a rotary shaft 31 that is journalled at one end portion in a bearing 32 suitably mounted on the partition 8, see FIG. 2, and in anti-friction bearings 33 in opposite end portions of the tubular support member 29, see FIGS. 2 and 7. The support member 29 is formed to provide depending legs 34 having transverse angle bars 35 rigidly secured to their lower ends and to the outer end portions of which are bolted the lower ends of leaf springs 36 that extend angularly upwardly toward the bottom wall 26 of the conveyor tray 25. The upper ends of the resilient leaf springs 36 are rigidly secured to mounting brackets 37 bolted or otherwise secured to the bottom wall 26 of the conveyor tray 25.

Means for imparting oscillatory or vibratory movements to the conveyor tray 25 includes the rotary shaft 31, means for imparting rotary movement to the shaft 31 and linkage operatively connecting the shaft 31 to the conveyor tray 25, now to be described. Adjacent the end walls 7, the shaft 31 is provided with an oblique crank 38 on which is mounted, by means of a rolling friction bearing 39, a wobble member 40 having thereon a radially outwardly projecting pivot pin 41. A coupling element 42 is journalled on the pivot pin 41 and is pivotally connected as at 43 to one end of a pitman arm 44, the axis of the pivot connection 43 being normal to the axis of the pivot pin 41, see particularly FIG. 7. The pitman arm 44 extends generally longitudinally of the conveyor tray 25 and is pivotally connected at its opposite end to a transverse pivot pin or shaft 45 disposed on an axis parallel to the axis of the pivot connection 43. The pin or shaft 45 is mounted in a bracket 46 that is bolted or otherwise rigidly secured to the bottom wall 26 of the conveyor tray 25. With this arrangement, rotation of the shaft 31 produces limited reciprocatory movement to the pitman arm 44 and the conveyor tray 25 in a direction generally longitudinally of the tray 25. With reference to FIG. 2, it will be seen that the tray-supporting leaf springs 36 slope upwardly and generally toward the inlet end of the cylinder 12. Thus, oscillatory or vibratory movement imparted to the conveyor tray 25 will be in an angular direction generally upwardly and toward the discharge end of the cylinder 12 and downwardly and toward the inlet end of the cylinder 12. The generally upward movement of the conveyor tray 25 will cause material thereon to be impelled angularly upwardly and toward the discharge end of the cylinder and, as the tray 25 moves generally downwardly, it will catch the material to impel the same again toward the discharge end of the cylinder upon subsequent generally upward movement of the tray 25. Rotation is imparted to the cylinder 12 and shaft 31 by a drive motor 47 and power transmission mechanism operatively connecting the motor 47 to the cylinder 12 and shaft 31. The motor 47 is suitably mounted in the supporting frame structure or housing 1 adjacent the inlet end of the cylinder 12, a drive pulley 48 being secured fast on the drive shaft 49 of the motor 47. An endless drive belt 50 is entrained over the pulley 48 and a second pulley 51 mounted fast on the shaft 31 adjacent the bearing 32. It will be noted with reference to FIGS. 2 and 5 that the drive pulley 48 is of relatively small diameter, whereas the pulley 51 is of relatively large diameter whereby to provide a substantial reduction in speed between that of the motor shaft 49 and the rotary shaft 31. A variable pitch pulley 52 is mounted on the extreme end of the shaft 31 adjacent the pulley 51 and has entrained thereover an endless belt 53 that runs over another pulley 54 mounted fast on a jacketshaft 55 that is journalled in suitable bearings 56, one of which is shown as being mounted on the partition 8, see FIGS. 5 and 6. The belt 53 also runs over an idler pulley 57 that is journalled on one end of a mounting arm 58, the other end of which is pivotally secured, as at 59, to a mounting bracket 60. The mounting arm 58 is yieldingly urged in a direction to move the idler pulley 57 into operative engagement with the belt 53 by a coil tension spring or the like 61 secured at its opposite ends to the mounting arm 58 and bracket 60.

The variable pitch pulley 52 is of the well-known commercially available variety, and in and of itself does not comprise the instant invention. Hence, in the interest of brevity, detailed showing and description thereof is omitted. It should suffice to state that the pulley 52 comprises a pair of cooperating sheave sections 62 and 63, the former of which is rigidly secured to the rotary shaft 31 and the latter of which is movable axially toward and away from the section 62, the sections 62 and 63 having opposed conical faces which engage opposite sides of the belt 53 which, for the purpose of the present example, is in the nature of a conventional V-belt. Normally, the pulley or sheave sections 62 and 63 are urged apart by tension applied to the belt 53 by the spring 61. Means for moving the sheave section 63 toward its cooperating section 62 comprises an adjustment arm 64 that is swingably mounted at its upper end to a channel-like bracket 65 welded or otherwise rigidly secured to the housing end wall 6. At its lower end, the arm 64 has mounted therein an adjustable abutment 66 that engages an axially projecting portion 67 of the sheave section 63. A speed adjustment screw 68 is screw threaded through a nut element 69 welded or otherwise secured to the bracket 65, and at its outer end outwardly of the end wall 6 is provided with a control knob 70. The inner end of the speed adjustment screw 68 engages the arm 64 to adjustably move the sheave section 63 toward its cooperating section 62 responsive to rotary movement of the control knob 70 in one direction. Rotation of the knob 70 in the opposite direction permits the sheave section 63 to move axially away from its cooperating sheave section 62, to effectively reduce the pitch diameter of the variable pitch pulley 52. The adjustment screw 66 is utilized for the purpose of calibrating the control knob 70 with respect to an indicator dial used therewith, but not shown. A stop screw 71 screw-threadedly mounted on the arm 64 engages the nut element 69 to limit movement of the sheave section 63 in a direction away from the sheave section 62.

As shown in FIG. 6, and by dotted lines in FIG. 5, a relatively small diameter sprocket wheel 72 is mounted fast on the jackshaft 55, and has entrained thereover an endless link chain 73 that runs over a relatively large diameter sprocket wheel 74 mounted fast on the inlet end of the cylinder 12 and coaxial therewith, the sprocket 74 being annular and encompassing the adjacent portion of the inlet or delivery chute 21, see particularly FIG. 2. With the above described drive arrangement, it will be seen that the rotary shaft 31 is driven at substantially constant speed, while the speed of rotation of the cylinder 12 may be varied, through manipulation of the control knob 70, to accommodate different materials, the granules of which are of different length, width or thickness.

Adjustable means for effecting separation of granules in the pockets 24 during material elevating rotation of the cylinder 12 comprises a divider 75 which includes a generally radially disposed plate-like guide element 76 that generally overlies the conveyor tray 25 and which extends longitudinally substantially the length of the pocketed portion of the cylinder wall 13, a return guide portion 77 and end flanges 78. Preferably, the guide element and return guide portion are formed from a single sheet of metal, or the like, being folded to provide a longitudinal dividing edge 79 that is radially inwardly spaced from the inner cylindrical surface of the cylinder 12 a predetermined distance. The divider 75 is bolted or otherwise rigidly secured to the outer ends of a pair of supporting arms 79' that extend generally radially outwardly from the tubular member 29, and which are journalled on the tubular support member 29 for rotation on the axis of the cylinder 12. The arms 79' are pivotally connected to the upper ends of a pair of depending rigid links 80, the lower ends of which are pivotally connected to the radially outer ends of a pair of crank arms 81 having their inner ends keyed or otherwise rigidly secured to a rockshaft 82. The rockshaft 82 is disposed in downwardly spaced parallel relation to the tubular support 29 and rotary shaft 31, and is journalled at one end portion in the lower end portion of a depending leg 83 that is welded or otherwise rigidly secured at its upper end to the tubular support 29. At its opposite end portion, the rock shaft 82 is journalled in a bearing 84 mounted on the end wall 7, and has rigidly secured to its extreme outer end a crank arm 85 in the outer end portion of which is journalled a threaded nut 86. An adjustment screw 87 is screw-threaded through the nut 86 and is journalled in an enclosure 88, the screw 87 being provided with a handle-equipped wheel 89 outwardly of the enclosure 88 and a pair of stop collars 90 to limit the extent of adjustment which may be made by rotation of the handwheel 89. As shown in FIG. 1, the adjustment screw 87 may be provided with a traveling pointer 91 extending outwardly through a slot 92 in the enclosure 88 to indicate the position of the guide element 76 and dividing edge 79 thereof. From the above, it will be seen that rotation of the handwheel 89 will cause the divider 75 to move circumferentially about the axis of the rotary shaft 31 and the drum 12, whereby to maintain the distance between the dividing edge 79 and the inner surface of the cylinder 12 equal in all positions of adjusted movement of the divider 75, as shown by full and dotted lines in FIG. 3. By thus maintaining a predetermined distance between the dividing edge 79 and the inner surface of the cylinder 12, close control may be had of the separation of the granules elevated by the cylinder.

In the modified form illustrated in FIGS. 8 and 9, parts corresponding to like parts in the machine illustrated in FIGS. 1–8 are indicated by like reference characters with the suffix *a* added. In this form of size grader, a conveyor tray 93 is shown as comprising an imperforate bottom wall 94, upstanding side walls 95 and 96 having laterally outwardly diverging upper side wall portions 97 and 98 respectively, and a horizontally disposed elongated perforate wall 99 disposed in upwardly spaced parallel relation to the bottom wall 94. In this modified form of conveyor tray, the perforate wall 99 is shown as being in the nature of a screen for further separating the particles or granules that are elevated to the conveyor tray 93 by rotation of the cylinder 12a, the smallest particles dropping through the screen 99 to the bottom wall 94. With reference to FIG. 8, it will be seen that the perforate wall or screen 99 extends beyond the delivery end of the bottom wall 94 whereby to deliver particles or granules thereon to a discharge chute 100. The tray 93 is mounted for vibratory conveying movements in the same manner as the tray 25, and vibratory movements are imparted thereto by substantially identical mechanism including a rotary shaft 31a, crank and wobble mechanism including the wobble member 40a and pitman arm 44a. The divider 75a including the dividing element 76a is adjusted in the same manner as the divider 75 by substantially identical means including the rockshaft 82a, links 80a and crank arms 81a, one of each of which is shown. With this arrangement, the material delivered to the cylinder 12a is separated into three groups, the granules of smallest size being discharged through the discharge chute 22a from the bottom wall 94 of the tray 93, the intermediate sized particles or granules being discharged through the discharge chute 109 from the perforate wall 99, and particles or granules of the larger sizes being discharged from the cylinder 12a through the discharge chute 23a.

In the form of grader illustrated in FIGS. 10 and 11, a rotary cylinder 12b, identical to the cylinder 12, has mounted therein dividing and conveying means indicated generally at 101, said means comprising a plurality of superposed tray portions 102, 103 and 104, having respective dividing portions 105, 106 and 107. The tray portions 102, 103 and 104 extend longitudinally of the cylinder 12b, each being adapted to deliver material to respective discharge chutes 108, 109 and 110. The conveyor tray potrions and their respective dividing portions are suitably connected together and are mounted on leaf springs in the same manner as the conveyor tray 25, the leaf springs being operatively connected to a tubular support member 111, which is identical to the tubular support member 29 except that the member 111 is journalled for rotation on its own axis in a bearing bracket 112, which is otherwise similar to the supporting bracket 30. It will be noted that the tubular support member 111 is coaxial with the cylinder 12b so that the dividing edges 113, 114 and 115 defined by the dividing portions 105, 106 and 107 respectively, move in an arc concentric with the inner surface of the cylinder 12b, when the conveyor tray portions 102, 103 and 104 are rotated with the tubular support member 111 on its axis. For the purpose of the present example, the dividing and conveying means 101 is provided with a laterally outwardly projecting arm 116 that terminates in a wing nut-equipped stud 117 that projects through an arcuate slot 118 in an end wall of the housing or frame structure 1b, see FIG. 11, whereby the dividing and conveying means may be adjusted circumferentially of the cylinder 12b. With this arrangement, the smallest particles in the pockets, not shown, of the cylinder 12b will be elevated to a point where they fall into the conveyor tray portion 104 or to the dividing portion 107 and from thence to the tray portion 104, slightly larger granules or particles falling on to the dividing portion 106 and from thence to the tray portion 103, still larger particles or granules falling on the dividing portion 105 and from thence into the tray portion 102. Thus, with this structure and arrangement, the material is divided into four grades, according to length, width or thickness.

It will be appreciated that the tray portions 102, 103 and 104 may be mounted in the cylinder 12b in the same manner as the conveyor tray 25, in which event a plurality of dividers, one for each of the superposed tray portions. In such an arrangement, each divider may be individually adjustable, or all thereof may be adjusted as a single unit, as desired.

In all of the forms of the invention illustrated and described, the machine is self emptying, the vibratory conveyors gently urging the material thereon toward their respective discharge chutes, and the material in the bottom portion of the cylinder gravitating from the inlset end to the outlet end thereof during rotation of the cylinder, as is usual in graders of this general type. Inasmuch as the conveying of the material by the vibratory conveyors is not positive in the manner of an auger conveyor, injury to the material or to working parts of the grader does not occur in the event that the discharge chutes become filled to the extent that further feeding cannot be accomplished. Should this occur, the material in the conveyor tray merely overflows the sides thereof and falls to the bottom of the cylinder.

While I have shown and described a commercial embodiment of material size grader and several modified forms thereof, it will be appreciated that the same is capable of further modification without departure from the spirit and scope of the invention, as defined in the claims.

What I claim is:

1. A material size grader comprising:
   (a) a generally horizontal cylinder mounted for rotation on its axis and adapted to receive material at one end, elevate a portion of said material by its rotary movement, and discharge a portion of said material from its other end,
   (b) guiding and conveying means in said cylinder for material elevated by rotary movement of said cylinder and comprising:
      (1) a vibratory conveyor portion extending substantially the length of said cylinder and mounted therein for vibratory movements in directions to urge material thereon toward the discharge end of said cylinder,
      (2) and a longitudinally extending divider portion adjustably movable circumferentially of said cylinder and having a surface for guiding elevated material toward said conveyor portion and a longitudinal dividing edge radially inwardly spaced from the inner surface of said cylinder and describing an arc concentric to said cylinder during circumferential movement of said divider portion,
   (c) means for adjustably moving said divider portion selectively in opposite directions of said circumferential movement thereof,
   (d) and means for imparting rotary movement to said cylinder and vibratory movements to said conveyor portion.

2. A material size grader comprising:
   (a) a generally horizontal cylinder mounted for rotation on its axis and adapted to receive material at one end, elevate a portion of said material by its rotary movement, and discharge a portion of said material from its other end,
   (b) a vibratory conveyor tray extending substantially the length of said cylinder and mounted therein for reception of material elevated by rotary movement of said cylinder and for vibratory movements in directions to urge material thereon toward the discharge end of said cylinder,
   (c) a generally radial divider element extending longitudinally within said cylinder and having a surface for guiding elevated material towards said conveyor tray and a longitudinal dividing edge radially inwardly spaced from the inner surface of said cylinder,
   (d) means mounting said divider element for movements circumferentially of said cylinder with said dividing edge describing an arc concentric to said cylinder during such movements of the guide element,
   (e) means for adjustably moving said divided element selectively in opposite directions of said circumferential movement thereof,
   (f) and means for imparting rotary movement to said cylinder and vibratory movements to said conveyor tray.

3. A material size grader comprising:
   (a) a frame structure,
   (b) a generally horizontal rotary cylinder in said frame structure adapted to receive material at one end, elevate a portion of said material by its rotary movement, and discharge a portion of said material at its other end,
   (c) means mounting said cylinder in said frame structure for rotation on the axis of said cylinder,
   (d) an elongated vibratory conveyor tray extending substantially the length of said cylinder and adapted to receive material elevated by rotary movement of said cylinder,
   (e) means including a shaft coaxial with said cylinder and journalled in said frame structure, said shaft having support means thereon mounting said conveyor tray for vibratory movements in directions to urge material thereon toward the discharge end of said cylinder,
   (f) a generally radial divider element extending longitudinally within said cylinder in generally overlying relation to said conveyor tray and carried by said support means for movements circumferentially of said cylinder, said divider element having a dividing edge disposed radially inwardly of said cylinder and describing an arc concentric with said cylinder during circumferential movement of said divider element,
   (g) means for adjustably moving said divider element selectively in opposite directions of said circumferential movement thereof,
   (h) and means for imparting rotary movement to said cylinder and vibratory movement to said conveyor tray.

4. The structure defined in claim 3 in which said means for imparting vibratory movements to said conveyor tray includes said rotary shaft, a crank on said shaft, and a pitman arm operatively connected to said crank and to said conveyor tray, said means mounting said tray including a plurality of leaf springs each connected at one end to said conveyor tray and at the other end to said support means.

5. The structure defined in claim 3 in which said means for imparting rotary movement to said cylinder and vibratory movement to said conveyor tray comprises:
   (a) a motor,
   (b) power transmission connections between said motor and said shaft,
   (c) a crank on said shaft operatively connected to said conveyor tray for imparting vibratory movements to said tray responsive to rotary movement of said shaft,
   (d) means including a jackshaft, cooperating rotary drive elements on said shaft and jackshaft, and cooperating endless flexible transmission members entrained over said drive elements, one of said drive elements being a variable pitch pulley,
   (e) and means for varying the effective pitch diameter of said variable pitch pulley whereby to vary the speed of rotation of said cylinder independently of the speed of vibratory movement of said conveyor tray.

6. A material size grader comprising:
   (a) a frame structure,
   (b) a generally horizontal rotary cylinder in said frame structure adapted to receive material at one end, elevate a portion of said material by its rotary movement, and discharge a portion of said material at its other end, (c) means mounting said cylinder in said frame structure for rotation on the axis of said cylinder, (d) an elongated vibratory conveyor tray extending substantially the length of said cylinder and adapted to receive material elevated by rotary movement of said cylinder, (e) a tubular support member extending axially of said cylinder and rigidly secured at one end to said frame structure, (f) a rotary shaft extending axially of said support member and journalled therein and in said frame structure, (g) resilient means mounting said conveyor tray on said support member for vibratory movements in directions to urge material on said tray toward the discharge end of said cylinder, (h) a generally radial divider element extending longitudinally within said cylinder in generally overlying relation to said conveyor tray and mounted on said tubular support member for movements circumferentially of said cylinder, said divider element having a dividing edge disposed radially inwardly of said cylinder and describing an arc concentric with said cylinder during circumferential movement of said divider element, (i) means for adjustably moving said divider element selectively in opposite directions of said circumferential movement thereof, (j) and means for imparting rotary movement to said cylinder and vibratory movement to said conveyor tray.

7. The structure defined in claim 6 in which said means for adjustably moving said divider element comprises:
(a) a crank shaft rotatably carried by said support member in spaced parallel relation thereto,
(b) crank elements on said crank shaft at least one of which is operatively connected to said divider element,
(c) and an adjustment member operatively carried by said frame structure and operatively coupled to one of said crank elements.

8. The structure defined in claim 1 in which said divider portion comprises a side wall element of said conveyor portion, said conveyor portion being movable with said divider portion in said directions of circumferential movement thereof.

9. A material size grader comprising:
(a) a generally horizontal cylinder mounted for rotation on its axis and adapted to receive material at one end, elevate a portion of said material by its rotary movement and discharge a portion of said material from its other end,
(b) guiding and conveying means in said cylinder for material elevated by rotary movement of said cylinder and comprising:
  (1) a plurality of vibratory conveyor portions in superposed spaced relationship extending substantially the length of said cylinder and mounted therein for vibratory movements in directions to urge material thereon toward the discharge end of said cylinder,
  (2) and a plurality of longitudinally extending divider portions, one for each of said conveyor portions and each adjustably movable circumferentially of said cylinder and each having a surface for guiding elevated material toward its respective conveyor portion, each divider portion having a longitudinal dividing edge radially inwardly spaced from the inner surface of said cylinder and describing an arc concentric to said cylinder during circumferential movement of its respective divider portion,
(c) means for imparting common adjustment movements to said divider portions selectively in opposite directions of said circumferential movement thereof,
(d) and means for imparting rotary movement to said cylinder and vibratory movements to said conveyor portions.

10. The structure defined in claim 3 in which said conveyor tray comprises a generally flat bottom wall, laterally spaced upwardly projecting longitudinal side walls, and a perforate longitudinal partition disposed between said side walls in upwardly spaced generally parallel relation to said bottom wall.

References Cited by the Examiner

UNITED STATES PATENTS

| 161,179 | 3/1875 | Toepfer | 209—95 |
| 2,771,192 | 11/1956 | Lindahl et al. | 209—95 |
| 2,858,019 | 10/1958 | Lindahl et al. | 209—95 |
| 2,861,684 | 11/1958 | MacGillivray | 209—95 |

FOREIGN PATENTS 914,796  7/1954  Germany.

M. HENSON WOOD, JR., *Primary Examiner.*

A. N. KNOWLES, *Assistant Examiner.*